(No Model.)

C. A. IVERSEN.
CAR STARTER.

No. 313,824. Patented Mar. 10, 1885.

WITNESSES:
Fred. G. Dieterich
Wm. Fecher

Christian A. Iversen
INVENTOR.
By Louis Bagger & Co.
ATTORNEYS.

United States Patent Office.

CHRISTIAN AUGUST IVERSEN, OF COPENHAGEN, DENMARK.

CAR-STARTER.

SPECIFICATION forming part of Letters Patent No. 313,824, dated March 10, 1885.

Application filed January 27, 1885. (No model.)

*To all whom it may concern:*

Be it known that I, CHRISTIAN AUGUST IVERSEN, a subject of the King of Denmark, residing at Copenhagen, in the Kingdom of Denmark, have invented certain new and useful Improvements in Car-Starters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
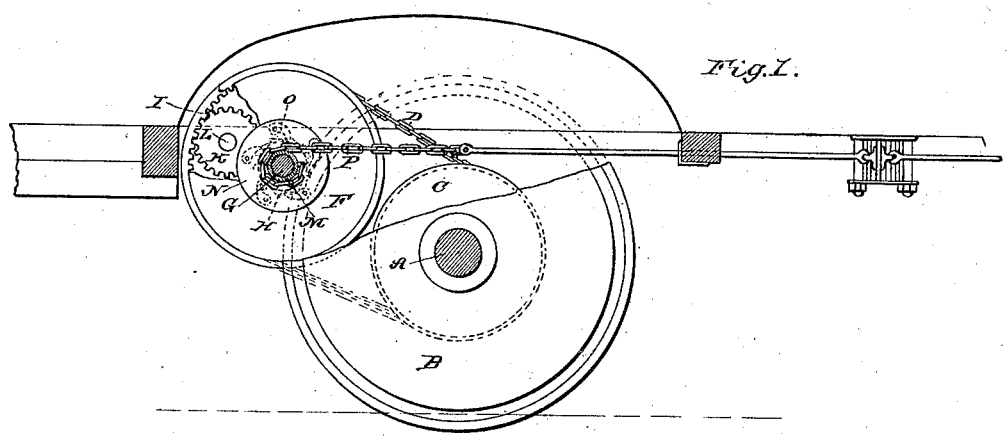
Figure 2:
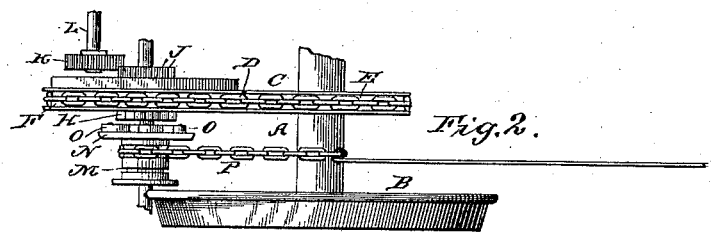
Figure 3:
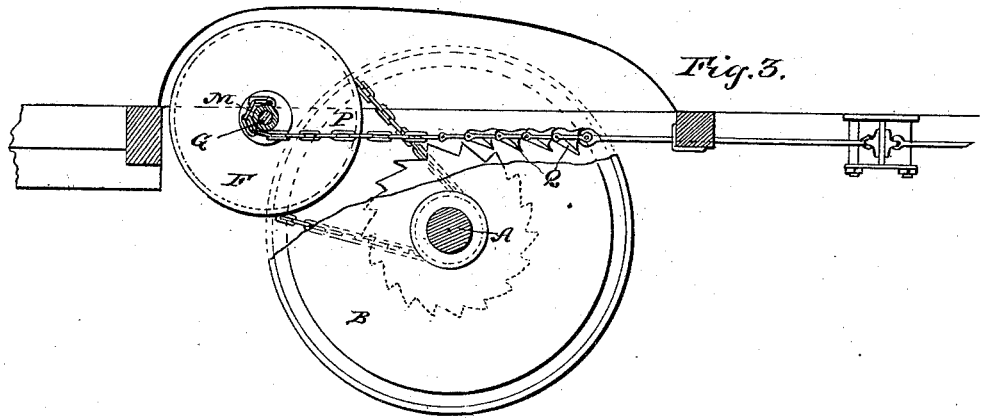
Figure 4:
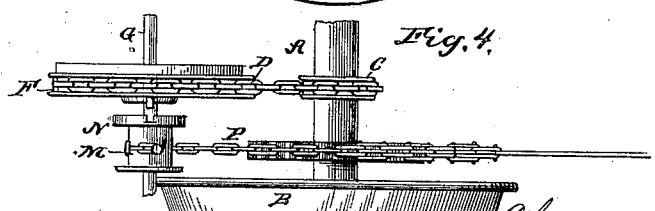

Figure 1 is a side view, with portions broken away, of my improved brake and car-starter. Fig. 2 is a top view of the same. Fig. 3 is a side view of a slight modification of the same, and Fig. 4 is a top view of the said modification.

Similar letters of reference indicate corresponding parts in all the figures.

My invention has relation to that class of vehicle-brakes in which the wheel in rolling forward before stopping will wind a chain which gradually stops the wheel; and it consists in the improved construction and combination of parts of such a brake in which the energy used in stopping the revolutions of the wheel is stored up in a spring and again released in starting, helping the starting of the vehicle, as hereinafter more fully described and claimed.

In the accompanying drawings, the letter A indicates the axle of the wheel B, to which the mechanism is applied. A pulley, C, is secured upon the axle, and has a chain, D, passing around it in a groove, E, in its periphery, which chain passes around the grooved periphery of a pulley, F, which turns upon and slides upon a shaft, G, and which pulley has a smaller ratchet-wheel, H, secured upon one side, and an inwardly-facing cogged rim, I, upon the other side. A pinion, J, is secured upon the shaft G, and engages a pinion, K, secured upon the end of a shaft, L, which slides axially, so that the pinion upon its end may engage the cogged rim upon the pulley, and be disengaged from it, all the time meshing with the pinion J. A drum, M, is secured upon the shaft G, and has at its inner end a disk, N, provided upon its inner face with a number of spring-pawls, O, which may engage the ratchet-wheel H; and a chain, P, is attached at one end to the drum and winds upon it, while the other end of the chain is attached to the end of a rod which is secured to the storing-spring, which will be compressed by drawing the chain and rod out.

When it is desired to stop the vehicle, the shifting shaft L is pushed toward the pulley, so as to engage the pinion with the cogged rim, and at the same time so as to push the pulley toward the pawl-carrying disk, and it will be seen that the revolving wheel will, by means of the chain D, revolve the pulley, which, through the pinion K, will revolve the pinion J and its shaft, together with the drum, upon which the chain will be wound, the chain-drum revolving in a direction opposite to the revolution of the pulley. The power will thus be stored in the spring, which is compressed by the winding up of the chain, and when the shifting shaft and its pinion is drawn out of engagement with the cogged rim the tension of the spring will draw upon the chain, unwinding the same and revolving the chain-drum, which by its pawl will revolve the ratchet-wheel and its pulley, which in turn will revolve the vehicle axle and wheel by means of its chain, starting the vehicle.

In the modification shown in Figs. 3 and 4 the ratchet-wheel is secured upon the vehicle-axle, and the pulley F has means for engaging the shaft G and revolve with it or turn loosely upon the shaft, while the chain P is provided with a number of downwardly-swinging pawls, Q, which may engage the ratchet-wheel. It will now be seen that when the vehicle is to be stopped the pulley F is connected with the shaft G so as to revolve it when it is revolved by the wheel and axle, the chain-drum revolving with the shaft and winding the chain until the tension of the spring stops the revolutions. When the vehicle is now to be started, the pulley is disengaged from the shaft, which will be allowed to revolve freely, and allowing the chain to be drawn out by the tension of the spring, and the pawls upon the chain will engage the teeth of the ratchet-wheel and revolve it, starting the wheel and axle.

Having thus described my invention, I claim and desire to secure by Letters Patent of the United States—

The combination, in a car brake and starter, of the axle having the chain-pulley C, the pulley F, having ratchet-wheel H and cogged rim I, the shaft G, having the pinion J, and the chain-drum M, provided with pawls P, the shifting shaft L, having the pinion K, the chain P, secured to the drum, and the power-storing spring having the chain attached to it, as and for the purpose shown and set forth.

In testimony whereof I affix my signature in presence of two witnesses.

CHRISTIAN AUGUST IVERSEN.

Witnesses:
FREDERIK WOLFF,
CARL STENDER.